United States Patent
Bolton et al.

(10) Patent No.: US 7,139,351 B2
(45) Date of Patent: Nov. 21, 2006

(54) METHOD OF AND CONTROL SYSTEM FOR CONTROLLING A NUCLEAR REACTOR OUTLET TEMPERATURE

(75) Inventors: Roland Leslie John Bolton, Kempton Park (ZA); Michael Christiaan Nieuwoudt, Centurion (ZA)

(73) Assignee: Pebble Bed Modular Reactor (Proprietary) Limited, Centurion (ZA)

( * ) Notice: Subject to any disclaimer, the term of this patent is extended or adjusted under 35 U.S.C. 154(b) by 0 days.

(21) Appl. No.: 10/472,704

(22) PCT Filed: Mar. 26, 2002

(86) PCT No.: PCT/IB02/00923

§ 371 (c)(1),
(2), (4) Date: Sep. 23, 2003

(87) PCT Pub. No.: WO02/079889

PCT Pub. Date: Oct. 10, 2002

(65) Prior Publication Data

US 2004/0114703 A1 Jun. 17, 2004

(30) Foreign Application Priority Data

Mar. 29, 2001 (ZA) ................. 2001/2600

(51) Int. Cl.
*G21C 7/06* (2006.01)
(52) U.S. Cl. .............. 376/219; 376/236; 376/241; 376/247; 376/379

(58) Field of Classification Search ........ 376/236–238, 376/241, 242, 244, 219, 247, 379
See application file for complete search history.

(56) References Cited

U.S. PATENT DOCUMENTS

| 3,625,815 | A | * | 12/1971 | Fishman ................. 376/216 |
| 4,204,909 | A | | 5/1980 | Giuggio et al. |
| 4,326,917 | A | * | 4/1982 | Kelly et al. ............. 376/216 |
| 4,770,843 | A | * | 9/1988 | Taleyarkhan ............ 376/216 |
| 4,879,087 | A | * | 11/1989 | Akiyama et al. ......... 376/216 |

FOREIGN PATENT DOCUMENTS

| EP | 0 097 488 | | 1/1984 |
| EP | 0 185 455 A1 | | 11/1985 |
| FR | 2 583 207 | | 12/1986 |
| FR | A-2 583 207 | * | 12/1986 |
| GB | 2 247 770 | | 3/1992 |

\* cited by examiner

*Primary Examiner*—Ricardo Palabrica
(74) *Attorney, Agent, or Firm*—Merchant & Gould P.C.

(57) ABSTRACT

The invention relates to a control system for controlling an average temperature of a coolant at a reactor core outlet. The control system method detects an average temperature of the coolant at the reactor core outlet, compares the actual average temperature of the coolant at the reactor core outlet with a reference temperature thereby to generate an error signal, and adjusts the actual average temperature of the coolant at the reactor core outlet in response to the error signal. The invention extends to a cascade controller for a nuclear reactor, and to a nuclear power plant.

5 Claims, 1 Drawing Sheet

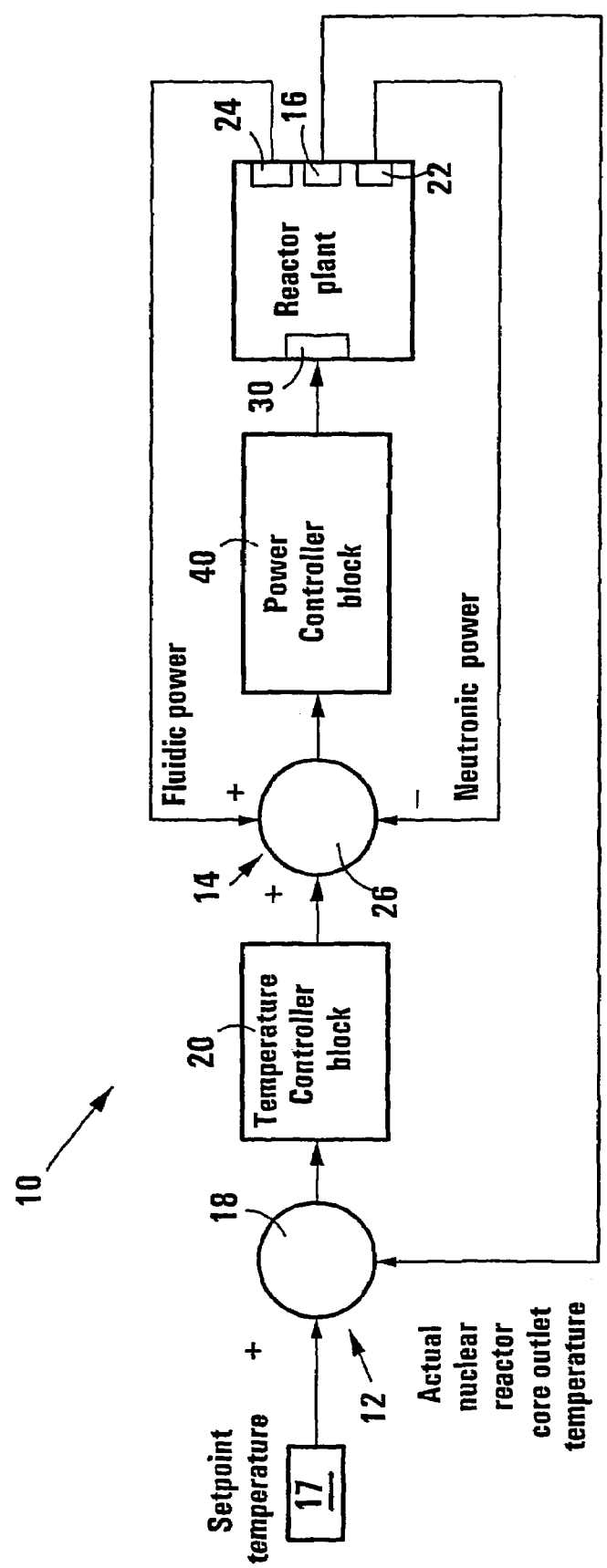

METHOD OF AND CONTROL SYSTEM FOR CONTROLLING A NUCLEAR REACTOR OUTLET TEMPERATURE

THIS INVENTION relates to a method of controlling an average temperature of the coolant at a reactor core outlet. It also relates to a nuclear reactor outlet temperature control system and to a cascade controller for a nuclear reactor.

In a nuclear reactor plant, it is desirable that the reactor will not become overheated. Accordingly, the rate of neutron generation and the consequent rate of the fission reaction—the energy of which appears as heat—must be controlled. This is achieved by positioning control rods of a neutron absorbing material, which are insertable into the nuclear reactor core to a variable depth of insertion.

According to one aspect of the invention there is provided a method of controlling an average temperature of a coolant at a reactor core outlet, which method includes the steps of detecting an actual average temperature of the coolant at the reactor core outlet;

comparing the actual average temperature of the coolant at the reactor core outlet with a reference temperature thereby to generate an error signal; and adjusting the actual average temperature of the coolant at the reactor core outlet in response to the error signal.

Adjusting the actual average temperature of the coolant may include feeding the error signal, as well as signals corresponding to a fluidic power and a neutronic power of the reactor to a control rod control system, and controlling the position of the control rods in response thereto.

The method may include transforming the temperature error signal into a power signal, combining the so-transformed power signal with a measured reactor neutronic power and a measured reactor fluidic power thereby to generate a control signal, and adjusting the actual average temperature of the coolant at the reactor core outlet in accordance with the control signal.

Generating the control signal may include transforming a power error signal, derived from the power signal, measured reactor neutronic power and measured reactor fluidic power, into a control rod adjustment signal.

Adjusting the actual average temperature of the coolant at the reactor core outlet may include feeding the control rod adjustment signal into a control rod control system and adjusting a control rod insertion depth in response thereto.

According to still another aspect of the invention there is provided a nuclear reactor outlet temperature control system which includes a detector for detecting an actual average temperature of the coolant at a reactor core outlet;

a temperature comparator for comparing the actual average temperature of the coolant at the reactor core outlet as detected by the detector with a set point temperature of the coolant at the reactor core outlet and for generating a temperature error signal;

temperature error signal transforming means for transforming the temperature error signal into a power signal; and control rod adjustment means for receiving the power signal and signals corresponding to a reactor neutronic power and a reactor fluidic power and adjusting the position of the control rods in response thereto.

The control rod adjustment means may be in the form of a control rod insertion depth controller for controlling the depth of insertion of the control rods into the nuclear reactor core.

The control rod adjustment means may include a power comparator for comparing a measured reactor neutronic power, a measured reactor fluidic power and the power signal, thereby to generate a power error signal. The control rod adjustment means may further include power error signal transforming means for transforming the power error signal into a control rod adjustment signal.

The control system may include reference means, coupled to the comparator, for providing a manifestation of the set point temperature.

The control system may further include a reactor neutronic power sensor system, for sensing the reactor neutronic power and generating a signal of the measured value thereof, and a reactor fluidic power sensor system, for sensing the reactor fluidic power and generating a signal of the measured value thereof.

By reactor neutronic power is to be understood the rate of neutron formation, and hence the rate of heat generation, in the reactor core. The reactor neutronic power is therefore a variable derived from neutron flux. By reactor fluidic power is to be understood the rate of heat transfer to a working fluid of the reactor. Reactor fluidic power is therefore a function of both the temperature gradient across the reactor core and the mass flow rate of the working fluid through the reactor core.

Adjusting the control rod insertion depth results in a corresponding change in the rate of neutron generation, and therefore in the rate of the fission reaction and the reactor neutronic power. The change in neutronic power results in turn in a change in the average temperature of the coolant at the reactor core outlet.

More particularly, the invention consists of a cascade controller for a nuclear reactor, the controller having an inner loop and an outer loop, the inner loop regulating an error between a reactor neutronic power and a reactor fluidic power by manipulating an insertion depth of control rods of the reactor and the outer loop regulating an average temperature of coolant at the reactor core outlet by manipulating an error set point for the inner loop.

The invention will now be described, by way of example, with reference to the accompanying diagrammatic drawing, which shows a schematic diagram of a nuclear reactor outlet temperature control system in accordance with the invention.

In the drawing, reference numeral 10 refers generally to a nuclear reactor outlet temperature control system in accordance with the invention.

The control system 10 includes a detector 16 for detecting an actual average temperature of the coolant at the reactor core outlet. The detector 16 is coupled to a temperature comparator 18. The system 10 further includes reference means 17 coupled to the comparator 18, the reference means 17 providing a manifestation of a desired average temperature of the coolant at the reactor core outlet, commonly referred to as a set point temperature of the coolant at the reactor core outlet.

In use, the temperature comparator 18 compares an actual average temperature of the coolant at the reactor core outlet, as detected by the detector 16, with a set point temperature of the coolant at the reactor core outlet, as manifested by the reference means 17, and generates a temperature error signal in accordance with the comparison.

The control system 10 includes temperature error signal transforming means 20 for transforming the temperature error signal generated by the temperature comparator 18 into a power signal.

The control system 10 further includes a reactor neutronic power sensor 22, for sensing a reactor neutronic power, and a reactor fluidic power sensor 24, for sensing a reactor fluidic power. The control system 10 also includes a power comparator 26 to which the transforming means 20 and each of the sensors 22, 24 are coupled.

In use, the power comparator 26 compares the neutronic power as detected by sensor 22, the fluidic power as detected by sensor 24 and the power signal from the transforming means 20, and generates a power error signal in accordance with the comparison.

The control system 10 includes power error signal transforming means 40 for transforming the power error signal, generated by the comparator 26, into a control rod adjustment signal. The control system 10 includes control rod adjustment means 30, in the form of a control rod insertion depth controller, which is configured to receive the control rod adjustment signal transmitted from the transforming means 40 and to adjust the depth of insertion of control rods of the nuclear reactor into the reactor core in response thereto.

The control system 10 includes two cascade control loops—an outer control loop or temperature control loop, generally indicated by reference numeral 12, and an inner control loop or power control loop, generally indicated by reference numeral 14—that is, an outer control loop which operates an inner control loop in turn. The detector 16, the reference means 17, the comparator 18 and the transforming means 20 all form part of the outer control loop 12, the reactor neutronic power sensor 22, the reactor fluidic power sensor 24, the comparator 26 and the transforming means 40 all forming part of the inner control loop 14. An output signal (that is, the power signal) of the outer control loop 12 represents a function of the deviation of the actual average temperature of the coolant at the reactor core outlet from the set point (or desired) temperature of the coolant at the reactor core outlet. This power output signal triggers the inner control loop 14. The inner control loop 14 in turn controls the reactor neutronic power, via control rod displacement, in accordance with the output power signal of the outer control loop 12.

The input signals for the outer control loop 12 are therefore the actual average temperature of the coolant at the reactor core outlet and the set point temperature of the coolant at the reactor core outlet. An error of these two input signals is transformed into the power signal, which power signal constitutes the output signal of the outer control loop 12 and is, in turn, an input signal for the inner control loop 14, together with the measured reactor neutronic power, as sensed by the reactor neutronic power sensor 22, and the measured reactor fluidic power, as sensed by the reactor fluidic power sensor 24.

In use, the control system 10 is typically activated when the nuclear reactor is in a standby mode or in an operation mode, and during transitions between the different operation modes.

The invention extends to a nuclear power plant incorporating a control system in accordance with the invention.

In a nuclear power plant having a reactor unit and a power conversion unit, the reactor unit facilitating the conversion of nuclear energy into thermal energy which is transferred to the working fluid, and the power conversion unit facilitating the conversion of thermal energy into electricity, the maximum temperature in a closed circuit for the working fluid, which circuit interconnects the reactor unit and power conversion unit, is set by the average temperature of the coolant at the reactor core outlet. The control system 10 in accordance with the invention facilitates regulation of the maximum temperature in such closed circuit.

Furthermore, the inventors are aware of the problem of hunting of reactor nuclear power (and hence of nuclear reactor core outlet temperature) which results in peaks (or spikes) in the nuclear power magnitude, which peaks may be damaging to the nuclear fuel. The inventors believe that by making use of the described integrated temperature controller the problems of hunting and spikes will at least be alleviated.

The invention claimed is:

1. A nuclear reactor outlet temperature control system which includes an outer control loop comprising:
a detector configured to detect an actual average temperature of coolant at a reactor core outlet;
a temperature comparator configured to compare the actual average temperature of the coolant at the reactor core outlet as detected by the detector with a set point temperature of the coolant at the reactor core outlet and to generate a temperature error signal; and
temperature error signal transforming means for transforming the temperature error signal into a power signal; and an inner control loop comprising:
a reactor neutronic power sensor system configured to sense a rate of heat generation within the reactor core and generating a signal corresponding thereto;
a reactor fluidic power sensor system configured to directly sense a rate of heat transfer to a working fluid flowing through the reactor core and to generate a signal corresponding thereto;
a power comparator configured to receive and compare the signals from the reactor neutronic power sensor system and the reactor fluidic power sensor system and to receive the power signal from the outer loop and compare it with the result of the comparison between the signals from the reactor neutronic power sensor system and the reactor fluidic power sensor system and generate a power error signal; and
control rod adjustment means for adjusting a position of a control rod in response to the power error signal.

2. A control system as claimed in claim 1, in which the control rod adjustment means is in a form of a control rod insertion depth controller configured to control depth of insertion of the control rod into the nuclear core.

3. A control system as claimed in claim 1, which includes power error signal transforming means configured to receive the power error signal from the power comparator, transform the power error signal into a control rod adjustment signal and feed the control rod adjustment signal to the control rod adjustment means.

4. A control system as claimed in claim 1, which includes a reference means, coupled to the temperature comparator, for providing a manifestation of the set point temperature.

5. A nuclear power plant which includes a nuclear reactor outlet temperature control system including an outer control loop comprising:
a detector configured to detect an actual average temperature of coolant at a reactor core outlet;
a temperature comparator configured to compare the actual average temperature of the coolant at the reactor core outlet as detected by the detector with a set point temperature of the coolant at the reactor core outlet and to generate a temperature error signal; and temperature error signal transforming means for transforming the temperature error signal into a power signal; and an inner control loop comprising:
- a reactor neutronic power sensor system for sensing a rate of heat generation within the reactor core and generating a signal corresponding thereto;
- a reactor fluidic power sensor system configured to directly sense a rate of heat transfer to a working fluid flowing through the reactor core and to generate a signal corresponding thereto;
- a power comparator configured to receive and compare the signals from the reactor neutronic power sensor system and the reactor fluidic power sensor system and to receive the power signal from the outer loop and compare it with the result of the comparison between the signals from the reactor neutronic power sensor system and the reactor fluidic power sensor system and generate a power error signal; and control rod adjustment means for adjusting a position of a control rod in response to the power error signal.

* * * * *